US007132172B2

(12) United States Patent
Buresch et al.

(10) Patent No.: US 7,132,172 B2
(45) Date of Patent: Nov. 7, 2006

(54) COMPOSITE MATERIAL FOR USE IN THE MANUFACTURE OF ELECTRICAL CONTACTS AND A METHOD FOR ITS MANUFACTURE

(75) Inventors: Isabell Buresch, Illertissen (DE); Hermann Strum, Bellenberg (DE); Roland Binder, Voehringen (DE)

(73) Assignee: Wieland-Werke AG, Ulm (DE)

( * ) Notice: Subject to any disclaimer, the term of this patent is extended or adjusted under 35 U.S.C. 154(b) by 243 days.

(21) Appl. No.: 10/744,908

(22) Filed: Dec. 23, 2003

(65) Prior Publication Data

US 2004/0202884 A1 Oct. 14, 2004

(30) Foreign Application Priority Data

Dec. 27, 2002 (DE) ................................ 102 61 303

(51) Int. Cl.
*B32B 5/16* (2006.01)
*B32B 15/01* (2006.01)
*B32B 15/16* (2006.01)
*H01R 3/00* (2006.01)

(52) U.S. Cl. ...................... 428/556; 428/553; 428/559; 428/564; 428/646; 428/673; 439/886

(58) Field of Classification Search ..................... None
See application file for complete search history.

(56) References Cited

U.S. PATENT DOCUMENTS

| | | | | |
|---|---|---|---|---|
| 4,652,349 | A * | 3/1987 | Behringer et al. | 205/109 |
| 5,445,895 | A | 8/1995 | Behrens et al. | |
| 5,679,471 | A * | 10/1997 | Cheng et al. | 428/673 |
| 5,967,860 | A * | 10/1999 | Ricketts et al. | 439/886 |
| 6,254,979 | B1 * | 7/2001 | Drew et al. | 428/323 |
| 6,350,294 | B1 | 2/2002 | Renner et al. | |
| 6,844,085 | B1 * | 1/2005 | Takayama et al. | 428/674 |
| 6,923,692 | B1 * | 8/2005 | Niebauer | 439/886 |
| 2004/0000985 | A1 * | 1/2004 | Komatsu | 338/202 |

FOREIGN PATENT DOCUMENTS

| | | | |
|---|---|---|---|
| DE | 195 03 184 | | 5/1996 |
| EP | 0 225 080 | | 6/1987 |
| JP | 06-228678 | * | 8/1994 |

(Continued)

OTHER PUBLICATIONS

English Machine Translation of JP 06-228678, Aug. 1994, Shibata et al.*

(Continued)

*Primary Examiner*—Jennifer C. McNeil
*Assistant Examiner*—Jason L. Savage
(74) *Attorney, Agent, or Firm*—Flynn, Thiel, Boutell & Tanis, P.C.

(57) ABSTRACT

An electrically conductive composite material for use in the manufacture of electrical contact components, consisting of a metal strip and a contact layer made of a silver or tin contact material, which contact layer is applied at least to one side of the metal strip, whereby the contact material contains as a first additive 0.5 to 60 weight percentage of carbon powder in the form of fine particles having a diameter of $ø_1$=5 to 200 nm and 0.5 to 60 weight percentage of a second powdery additive in the form of fine particles having a diameter of $ø_2$=5 to 200 nm. Moreover a device for the gas atomization of a jet of a flowable or liquid material and a method for the manufacture of an electrically conductive composite material and its use are disclosed.

11 Claims, 2 Drawing Sheets

FOREIGN PATENT DOCUMENTS

| | | |
|---|---|---|
| JP | 08-239724 | * 9/1996 |
| JP | 08-283882 | * 10/1996 |
| JP | 09-143594 | * 6/1997 |

OTHER PUBLICATIONS

Englsih Machine Translation of JP 08-239724, Sep. 1999, Weise et al.*

* cited by examiner

COMPOSITE MATERIAL FOR USE IN THE MANUFACTURE OF ELECTRICAL CONTACTS AND A METHOD FOR ITS MANUFACTURE

FIELD OF THE INVENTION

The invention relates to an electrically conductive composite material for use in the manufacture of electrical contact components consisting of a metal strip and a contact layer made of a silver or tin contact material, which contact layer is applied at least to one side of the metal strip. Moreover a device is provided for the gas atomization of a jet of flowable or liquid material and a method for the manufacture of an electrically conductive composite material.

BACKGROUND OF THE INVENTION

Such electrical contact components are utilized, for example, as plug contacts in plug connectors or in plug-connector connections in the automotive industry.

The design of the contact elements is of great importance for the reliability of plug connectors. The utilized contact carrier material together with the utilized contact surface determines during operation the aging behavior and the lifetime characteristics.

The known electrical contacts for this use consist usually of a base body (metal strip), in particular made of a Cu alloy, and a contact material applied galvanically, via hot dip tinning or via cladding. In particular gold, silver or tin layers are used for this purpose. A powder-metallurgical manufacture of the contact points, which are welded onto the contact area, is not possible for plug connectors, in particular the female part, since the contact area is being reshaped and thus is not freely accessible.

Thus a sufficient wear resistance and a low contact resistance of the plug connector system can be achieved during the planned lifetime only for operating voltages up to 14 Volt in view of the up to now demanded marginal conditions.

This, however, no longer applies when increased demands are made of the plug contacts, for example, with respect to the possible danger of the electric-arc formation in a 42 V electrical system in the automotive industry, or with respect to the placing of the plug contact in the direct vicinity of the motor due to high temperatures. The problems of an electric-arc creation is already known in the case of switching contacts, for example in the case of relays. The special contact layers are in the case of switching contacts applied in an additional operation through soldering or welding onto the carrier material. The contact material itself is manufactured in a preceding operating step by sintering or extrusion.

This phenomena appears only at a voltage above 16 Volt in common plug connections in the automotive field. The danger of the electric-arc formation and of the contact bouncing during plugging in or pulling out of the plug connector connections exists in a 42 V electrical system. The electric arc causes locally a heating up of the material to above 1000° C., this leads to the contact surfaces of the plug connectors being burnt off. It is also possible for incompletely plugged connections to cause through vibrations created during driving such electric arcs, which result in a crawling burning away and in the end a total breakdown of a plug connection.

A material for electrical contacts made of silver and carbon is known from the reference DE 195 03 184 Cl. This reference deals with a sintered material, which due to a certain carbon-black content has an improved burning characteristic. The carbon is for its manufacture added in the form of carbon black with a primary particle size of less than 150 nm to silver, the mixture is isostatically cold pressed and thereafter sintered. With the same goal, namely to improve the burning characteristics and the welding resistance, a composite material for electrical contacts is known from the reference DE 41 11 683 C2. The composite material consists of silver or a silver alloy with a carbon content, which is processed in the form of a combination of a carbon powder and carbon fibers in a mass ratio of 10:1 to 1:10 with the metal component.

The disadvantage of such materials is that their manufacture and further processing is not suited for the manufacture of electrical contact components in connection with a reshaping of the metal strips.

Furthermore, a device with an atomizer is known from the reference EP 0 225 080 B1, with which device a jet of a liquid metal is atomized with a gas jet into a spray mist consisting of droplets. The atomizer is thereby supported tiltably about a stationary axis in such a manner that the spray mist is evenly distributed on a moving band-shaped substrate or another collecting device. The device is used for the manufacture of thin metal strips or for coating of strips.

A surface-like even distribution of the applied metal layer is indeed achieved with this manufacturing method, however, it permits first of all only a simple material selection with one melt component. Furthermore an atomizer movable relative to the metal jet represents an additional apparatus expenditure.

SUMMARY OF THE INVENTION

The basic purpose of the invention is therefore to provide a metallic composite material, which is manufactured by means of a device, which is improved compared with the state of the art, and which also meets the increased demands mentioned above.

The purpose is attained, regarding the product, by an electrically conductive composite material for the manufacture of electrical contact components, consisting of a metal strip and a contact layer made out of a silver or tin contact material, which contact layer is applied at least to one side, whereby the contact material contains as the first additive 0.5 to 60 weight percentage of carbon powder in the form of fine particles with a diameter $ø_1$=5 to 200 nm and 0.5 to 60 weight percentage of a second powdery additive in the form of fine particles with a diameter $ø_2$=5 to 200 nm.

The composite material of the invention is suited in particular for plug connectors and plug-connector connections and also switching contacts.

The invention is thereby based on the premise that the composite material should have a plurality of characteristics which are optimally adjusted to one another. For the selection of a suitable contact material on a carrier material the following criteria or characteristics should among others be optimized:

Arc erosion resistance
high electrical/thermal conductivity
low needed contact force
abrasion/wear resistance
good working properties: solderable.

In particular the arc erosion resistance for use in 42 V electrical systems in the automotive field should thereby be the main topic in order to prevent a burning away of the contacts.

The electrically conductive composite material is for this purpose provided with an additive of carbon. The electric arc created during the plugging in and pulling out of plug connectors and contacts produces carbon compounds, through which an increase of the contact resistance through oxidation of the contact surfaces in the surrounding area is essentially prevented.

Thus the main portion of the contact layer is a metal having an already good electrical conductivity, which forms the matrix into which the two additives are embedded and finely distributed corresponding to their small diameter to form a homogeneous composite material. This has also a direct positive effect on further material characteristics. In particular, the finely distributed alloy components of varying hardness and the therewith achieved homogenization opposes the wear of a mechanically stressed surface.

The strips must be reshaped during the connector manufacturing. Part of a good workability involves the contact layer not peeling from the carrier during the reshaping. A preferred embodiment achieves an optimum by arranging an intermediate layer made of Ag or Sn with the thickness $D_3$=0.1 to 1 m between the metal strip and the contact layer. The intermediate layer is thereby deposited onto a cleaned and activated strip surface.

The contact material contains in a preferred embodiment as the first additive 3 to 40 weight percentage of a carbon powder in a plate-like and/or globularly and/or pearled form of fine particles having a diameter of $ø_1$=20 to 150 nm. Carbon has a decidedly low hardness in comparison to metallic materials. Especially for this reason it is of importance that the small particle size of this additive in the nanometer range leads to a composite material which has on its surface, due to metallic parts, a sufficient hardness and thus abrasion resistance against mechanical stress. The soft carbon powder is for this purpose embedded in a harder metallic skeletal matrix.

In addition to a first additive, the second additive considers materials which improve the electrical conductivity, arc-erosion resistance, hardness and abrasion resistance. Thus also metallic particles can be introduced. The second additive of a preferred embodiment has 2 to 50 weight percentage of a metal from the group Co, Cu, Mo, Ni, Ti, W in the form of fine particles having a diameter of $ø_2$=10 to 200 nm.

As an alternative hard particles can also be considered as the second additive. Advantageously these are 2 to 40 weight percentage of a carbide, preferably from the group SiC, Wc, in the form of fine particles having a diameter of $ø_2$=10 to 200 nm.

As an alternative the second additive is advantageously 0.5 to 40 weight percentage of a disulfide, preferably from the group $MoS_2$, $WS_2$, in the form of fine particles having a diameter of $ø_2$=50 to 200 nm.

The second additive is in a further alternative embodiment 2 to 40 weight percentage of oxide ceramic particles, preferably from the group $Al_2O_3$, $ZrO_2$, having a diameter of $ø_2$=50 to 150 nm.

Further advantageous, as the second additive, is 2 to 20 weight percentage of PTFE (polytetrafluoro-ethylene) in the form of fine particles having a diameter of $ø_2$=50 to 200 nm.

It is also of importance for the adhesiveness of the contact layer on the carrier that, besides the electrical characteristics, a reshaping is successful during the manufacture of the connector without removing the contact layer. The thickness of the metal strip is for this purpose in a preferred embodiment $D_1$=0.06 to 1.2 mm and the contact layer $D_2$=0.5 to 10 μm. Suitable thickness ratios result from this, which thickness ratios prevent a separating of the layers and also during reshaping procedures.

For a suitable composite material it is also necessary to choose the carriers accordingly. Preferred are thereby materials which have at least a good up to a very good electrical conductivity. The metal strip consists advantageously of Cu or a Cu alloy, of Fe or a Fe alloy, of Al or an Al alloy, of Ni or a Ni alloy.

The advantages achieved with the invention are, with respect to the composite material in particular, the composite material, at high plug-in and pull-out speeds, either prevents the creation of an electric arc or if an electric arc is created, it is immediately extinguished so that oxidation of the contact surface will not result. In particular the intermediate layer guarantees an optimum adhesiveness of the contact layer on the base material. Beyond already existing composite materials the inventive solution optimizes the characteristics of the composite material for use in electrical engineering techniques.

The purpose is attained with respect to the device for the gas atomization of a jet of a flowable or liquid material, for example a jet of liquid metal or a metal alloy, with an atomizing system for the admission of atomizing gas onto the jet for the atomization of the jet into a spray mist consisting of droplets, whereby the atomizing system. is constructed annularly or elongated, and has a continuous outlet gap for the atomizing gas. Above the area of the atomizing system there is arranged an injector for powder with a swirling chamber, which injector is connected to a solid material feed system.

The advantages achieved with the invention are, with respect to the device for the gas atomization, that powder parts in the swirling chamber are homogeneously moved into the spray mist. The high gas speed of the atomizing gas produces for this purpose in the area of the swirling chamber an underpressure which continuously effects a discharging of the powder particles from the chamber. The particle movement in the swirling chamber dissolves the agglomeration of fine powder particles and thus takes care of a homogeneous distribution in the separated layer. It is in particular possible to coat wider strips having an elongated form of the atomizing system without the gas-atomizing device or its parts being moved. The elongated part is for this purpose aligned perpendicularly with respect to the direction of movement of the strip material.

A loading of the spray mist with powder particles places, depending on the condition of the powder, different demands on the type of the admixture. The solid material feed system includes in a preferred embodiment a storage container for dry powder or a container for liquids loaded with powder with supply lines. Thus it is already possible to reduce the agglomeration of the particles through the powder preparation, in particular through a suspension in a suitable fluid.

The amount of material in the jet is advantageously controlled by a device having valve control and/or a device for the pressurization of a melt storage container. With a suitable pressurization it is possible to specifically control the material flow even without a valve since a melt flow can only be maintained with a suitable overpressure. An additional valve, however, permits yet shorter switching times to switch on and off the melt flow.

The purpose is attained, with respect to the method for the manufacture of a composite material with a device for the gas atomization, with the steps according to which a metal or a metal alloy is heated in a storage container above the melting point, the melt exists with pressurization in the form of a melt jet and is atomized by means of a flow of gas into a spray mist, is mixed with non-melting additives in particle form, and subsequently the atomized droplets are deposited on a metal strip as a carrier material or a collecting device.

A cooling conveyor moving under the spray jet can serve as the collecting device, from which cooling conveyor the spray product can be released.

The non-melting additives are fed in a preferred embodiment to the melt flow from a swirling chamber.

This manufacturing method can work either in a continuous operation or in a batch operation, where the strip to be coated is supplied either continuously or from a stack of superposed strip sections. The system is stored in a housing with an inlet and outlet lock, which housing is flooded with nitrogen or a nitrogen/hydrogen mixture. A strip-cleaning and strip-activating station is positioned in front of the inlet lock, with which station the strip surface is suitably prepared prior to the coating for a good adhesiveness of the deposited layer.

The atomization of the powder particles occurs in a preferred embodiment by using $N_2$. The additives are for this purpose blown into the spray jet with a pressure of 0.15 to 1.5 MPa. The nitrogen enters due to the overpressure with a very high pressure through an outlet gap into a mixing chamber in order to swirl around the powder particles introduced into the mixing chamber and to obtain an optimum thoroughly blended mixture. In addition, it is possible to effectively prevent an agglomeration of the nanopowder utilizing a sufficient gas speed, which gas speed can also lie above the supersonic range. The pressurization of the powder components is for this purpose suitably controlled for an optimum blending.

In order to be able to deposit in the manufacturing process the additives in a variable combination, the additives are advantageously blown independently from one another.

When choosing the depositing conditions, a uniform contact layer with finely dispersed additives is desired. The metal strip is for this purpose advantageously heated to a temperature of (0.6 to 0.9)$\times T_s$ of the contact material Sn or Ag. Thus it is possible to deposit such layers at the same time with a low porosity and high adhesion.

In order to improve the adhesiveness of the layer on the carrier material, the metal strip is, prior to the depositing of the layer, advantageously surface-treated with a fluxing agent for activation.

The layer thickness is adjusted through still other depositing parameters. The thickness $D_2$ of the contact layer is in a preferred embodiment for this purpose controlled by the spray jet density and the running speed of the metal strip to be coated. The spray jet density is preferably controlled by a needle valve or something similar. When the needle valve is thereby permanently open, then it is also possible for an all-over one-sided coating to occur. To create a uniform layer the metal strip can be pulled through under the spray jet at a constant speed. As an alternative, it is also possible to control alone without the valve device through a pressurization of the melt the material flow in the spray head.

By suitably choosing the depositing conditions it is possible to also specifically adjust the porosity of the contact layer. An open porosity of the contact layer of 70 to 85% is adjusted in a particularly advantageous embodiment through the chosen spray parameters. The porous contact layer is subsequently infiltrated with oil for self-lubrication.

Porous layers are aftertreated in a further method step by re-rolling the sprayed metal strip at a temperature of at least $0.8\times T_s$ of the layer matrix material in order to achieve a 100% thickness.

The metal strip is in a particularly preferred embodiment only partially coated. Thus it is possible to produce a partially resistive coating, for example, at the tip of a connector.

In the case of partially resistive coatings the current is continuously reduced during the pulling process so that in dependency of the material and the voltage starting with a certain boundary resistance an electric arc can no longer form. The burning away characteristic is in this manner minimized in the case of such automatically shutting off contacts.

For the manufacture of partially resistive coatings the metal strip is advantageously covered with a mask. As an alternative it is possible to shield the metal strip against the spray jet. The mask is for this purpose not placed onto the carrier but is positioned at a certain distance in the jet.

Electronics implemented in functions means on the one hand increased temperatures, on the other hand an increased vibration stress. This is particularly valid for multi-valve engineering. Current-conducting connections like plug connectors, press-fit connections, relay connections and wear and vibration resisting, high-temperature resistant coatings are needed for use in the automotive field. The electrically conductive composite material finds in this manner use in the automotive field and in particular in electric contact components like plug connectors and plug-connector connections.

The advantages achieved with the invention consist, with respect to the method in particular, in the contact coating of a metal strip being partially applied as a carrier material in order to manufacture automatically switching-off contacts with little burning away behavior. In particular a contact layer is produced on a carrier material during one operating sequence through a suitable parameter selection, which contact layer can be further processed directly as strip material. Beyond already existing manufacturing methods it is thus possible to include the coating process easily in a rational series production.

BRIEF DESCRIPTION OF THE DRAWINGS

Exemplary embodiments of the invention will be discussed in greater detail in connection with the drawings, in which.

DETAILED DESCRIPTION

Figure 1:
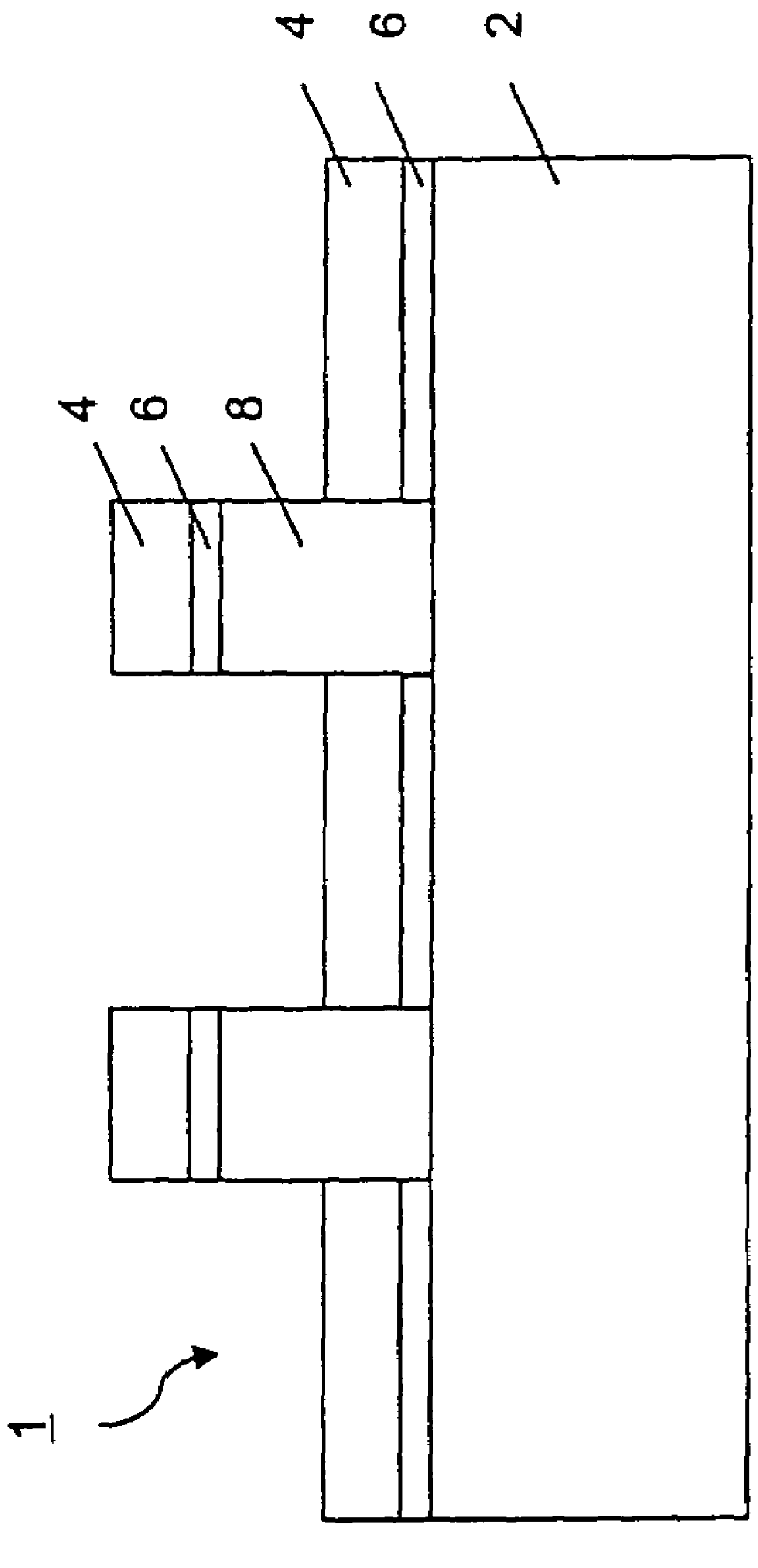
FIG. 1 illustrates a composite material having a carrier and a contact layer.

Corresponding parts have been identified with the same reference numerals in all figures.

The composite material 1 for the manufacture of electrical contact components consists of a metal strip 2 as the carrier made of metal and a contact layer 4 made of a silver or tin contact material, which contact layer is applied at least to one side thereof. The contact material contains as the first additive 0.5 to 60 weight percentage of carbon powder in the form of fine particles having a diameter of $ø_1$=5 to 200 nm and 0.5 to 60 weight percentage of a second powdery additive of varying materials in the form of fine particles with a diameter of $ø_2$=5 to 200 nm. An intermediate layer 6 made of Ag or Sn having a thickness $D_3$=0.1 to 1 μm is arranged between the metal strip 2 and contact layer 4. The thickness of the metal strip 2 is preferably $D_1$=0.06 to 1.2 mm and of the contact layer 4 $D_2$=0.5 to 10 μm. The metal strip 2 is surface-treated with a fluxing agent for activation.

Figure 2:
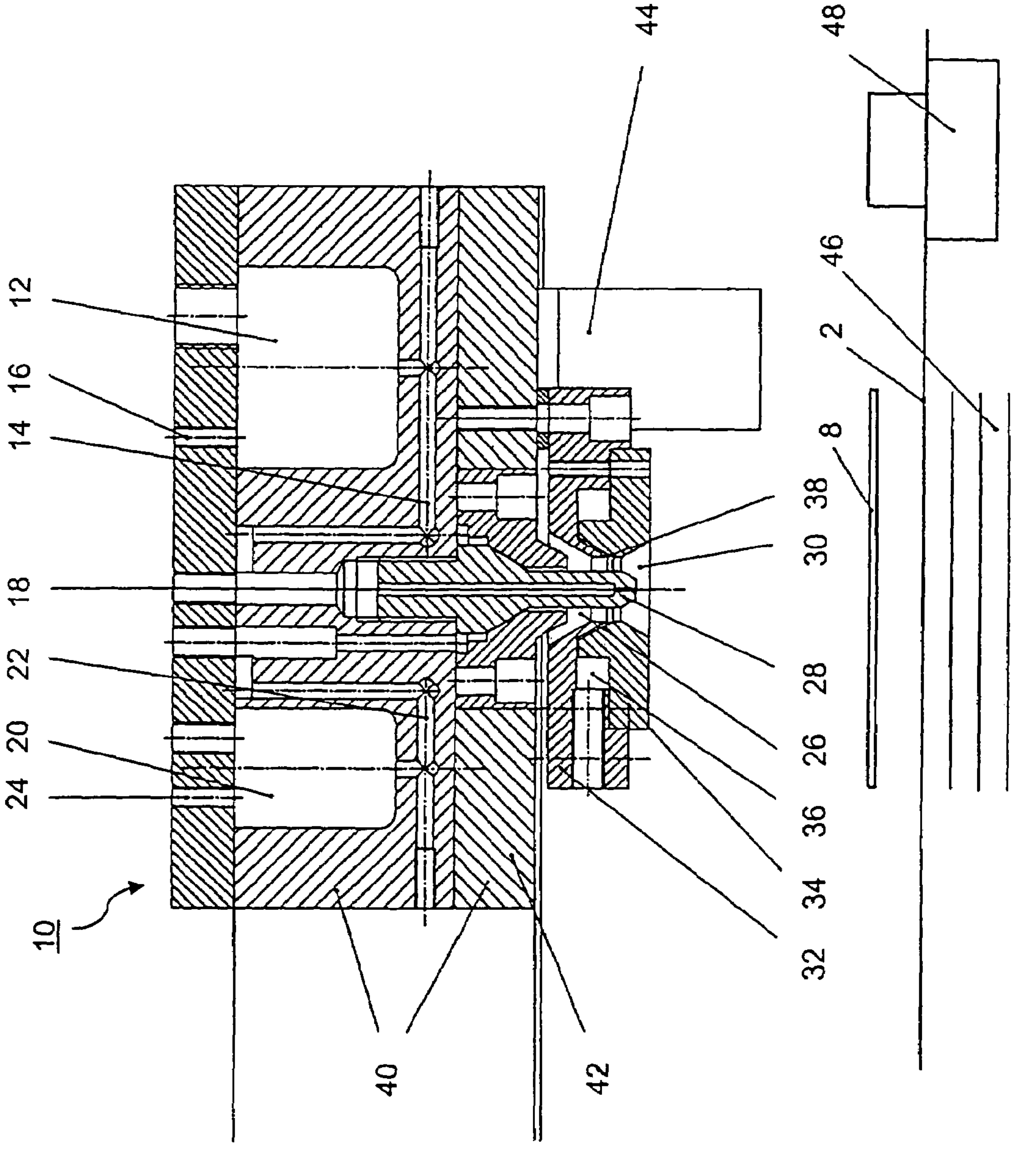
FIG. 2 is a schematic illustration of the gas-atomizing device.

The gas-atomizing device 10 schematically illustrated in FIG. 2 houses a melt container 12, which is arranged in a heated housing 40 and has filler necks and feed channels 14 for feeding the melt to a nozzle 28. A needle valve mechanism 18 is provided from which the jet of liquid metal or a metal alloy exits. The exiting amount is controlled by a connection 16 which subjects the chamber 12 to pressurization, which connection is mounted on the melt container 12. The filler neck on the melt container 12, to facilitate a pressurization thereof, is closed off gastight with a plug or a screw connection.

A container 20 is in addition arranged in the heated housing 40, which container has filler necks for liquids and mixtures made of a liquid loaded with powder. The container 20 is connected via feed channels 22 to the injector system 32 having a swirling chamber 26, which injector system 32 encircles the needle valve 18. The exiting amount from the container 20 is also controlled by a connection 24 mounted on the container 20 to subject the chamber 20 to pressurization. As an alternative or in addition, there exists the possibility to connect further solid material feed systems having a powder receptacle 44 for dry powder to the heated housing 40, which systems are connected to the injector system 32 via channels not shown in the schematic illustration. Further melt receptacles, if necessary with a separate heating system, can be docked to a connecting system 42.

The melt exiting through the needle valve 18 is mixed with the solid materials from the swirling chamber 26 and is loaded with atomizing gas from a $N_2$ atomizing system 34 so that from the jet is created a spray mist consisting of droplets, which spray mist is deposited on a strip 2. A $N_2$ chamber 36, directly in front of the $N_2$ outlet gap 38, assures a constant gas supply.

An outlet funnel 30 having a specified outlet cone shape, which guarantees a deposit over the entire strip width, is used to guide the spray jet.

A mask 8 is positioned in the path of the jet spray or on the substrate to facilitate a selective depositing.

The atomizing system 34 can be of an annular configuration or elongated into the image plane of FIG. 2, whereby same has a continuous outlet gap 38 for the $N_2$ atomizing gas. The metal strip 2 is pretreated on the surfaces with flow medium for activation by the cleaning and activating system 48. The strip can be coated in a continuous operation or in the form of a stacked array 46 in a batch operation.

LIST OF REFERENCE NUMERALS

1 Composite material
2 metal band
4 contact layer
6 intermediate layer
8 mask
10 gas-atomizing device
12 melt container
14 feed channels for melt
16 connection for pressurization
18 needle valve
20 container for liquids and mixtures
22 feed channels
24 connection for pressurization
26 swirling chamber
28 nozzle
30 outlet funnel/spray jet guide
32 injector system with swirl chamber
34 $N_2$ atomizing system
36 $N_2$ chamber
38 $N_2$ outlet gap
40 heated housing
42 connection for a further melt receptacle
44 powder receptacle
46 stacked position for batch operation
48 cleaning and activating system

What is claimed is:

1. An electrically conductive composite material used in the manufacture of electrical contact components, said composite material consisting of a metal strip, a contact layer and an intermediate layer provided between the metal strip and the contact layer, the contact layer being made of a silver or tin contact material which contains 0.5 to 60 wt. % carbon powder in the form of fine particles having a diameter $ø_1$ of 5 to 200 nm as a first additive and 0.5 to 60 wt. % of a second powdery additive in the form of fine particles having a diameter $ø_2$ of 5 to 200 nm for improving electrical conductivity, hardness and abrasion resistance, and the intermediate layer has a thickness $D_3$ of 0.1 to 1 μm and is made of Ag or Sn.

2. The composite material according to claim 1, wherein the contact material contains as the first additive 3 to 40 weight percentage of carbon powder having a plate-like and/or globular and/or pearl form of fine particles having a diameter $ø_2$ of 20 to 150 nm.

3. The composite material according to claim 1, wherein the second additive is 2 to 50 weight percentage of a metal selected from the group consisting of Co, Cu, Mo, Ni, $Ti_T$ and W in the form of fine particles having a diameter $ø_2$ of 10 to 200 nm.

4. The composite material according to claim 1, wherein the second additive is 2 to 40 weight percentage of a carbide in the form of small particles having a diameter $ø_2$ of 10 to 200 nm.

5. The composite material according to claim 1, wherein the second additive is 0.5 to 40 weight percentage of a disulfide from the group consisting of $MoS_2$ and $WS_2$ in the form of small particles having a diameter $ø_2$ of 50 to 200 nm.

6. The composite material according to claim 1, wherein the second additive is 2 to 40 weight percentage of $SnO_2$ in the form of small particles having a diameter $ø_2$ of 5 to 100 nm.

7. The composite material according to claim 1, wherein the second additive is 2 to 40 weight percentage of oxidic ceramic particles selected from the group consisting of $Al_2O_{3T}$ and $ZrO_{2T}$ having a diameter $ø_2$ of 50 to 150 nm.

8. The composite material according to claim 1, wherein the second additive is 2 to 20 weight percentage PTFE in the form of fine particles having a diameter $ø_2$ of 50 to 200 nm.

9. The composite material according to claim 1, wherein the thickness $D_1$ of the metal strip is 0.06 to 1.2 mm and $D_2$ of the contact layer is 0.5 to 10 μm.

10. The composite material according to claim 1, wherein the metal strip consists of Cu or a Cu alloy, of Fe or a Fe alloy, of Al or an Al alloy, or of Ni or a Ni alloy.

11. An electrically conductive composite material used in the manufacture of electrical contact components, said composite material consisting of a metal strip, a contact layer and an intermediate layer provided between the metal strip and the contact layer, the contact layer being made of a silver or tin contact material which contains 0.5 to 60 wt. % carbon powder in the form of fine particles having a diameter $ø_1$ of 5 to 200 nm as a first additive and 2 to 40 wt. % of a second powdery additive selected from oxide ceramic powders selected from the group consisting of $Al_2O_3$ and $ZrO_2$ having a diameter $ø_2$ of 50 to 150 nm and $SnO_2$ in the firm of small particles having a diameter $ø_2$ of 5 to 100 nm for improving electrical conductivity, hardness and abrasion resistance, and the intermediate layer has a thickness $D_3$ of 0.1 to 1 μm and is made of Ag or Sn.

* * * * *